United States Patent
Greiner et al.

[11] Patent Number: 5,727,884
[45] Date of Patent: Mar. 17, 1998

[54] LINEAR ROLLING BEARING

[75] Inventors: Heinz Greiner, Ebersbach; Thomas Winkler, Sulzbach; Annette Welsch, Bad Homburg; Horst Friedrich, Herschweiler-Pettersheim; Frank Scheib, Neunkirchen, all of Germany

[73] Assignee: INA Walzlager Schaeffler KG, Germany

[21] Appl. No.: 840,308

[22] Filed: Apr. 11, 1997

[30] Foreign Application Priority Data

Apr. 20, 1996 [DE] Germany .................. 196 15 722.6
Oct. 23, 1996 [DE] Germany .................. 196 43 737.7

[51] Int. Cl.$^6$ .................................................. F16C 29/06
[52] U.S. Cl. ....................................... 384/45; 384/13
[58] Field of Search ............................ 384/45, 44, 43, 384/13

[56] References Cited

U.S. PATENT DOCUMENTS

| | | | |
|---|---|---|---|
| 4,582,369 | 4/1986 | Itoh | 384/45 |
| 4,648,726 | 3/1987 | Katahira | 384/45 |
| 5,145,261 | 9/1992 | Narumiya | 384/45 |
| 5,299,465 | 4/1994 | Kasuga | 384/45 X |
| 5,308,165 | 5/1994 | Kamimura | 384/45 |
| 5,435,649 | 7/1995 | Kuwahara | 384/13 |
| 5,445,455 | 8/1995 | Holweg | 384/45 |

FOREIGN PATENT DOCUMENTS

| | | |
|---|---|---|
| 164540 | 4/1985 | European Pat. Off. . |
| 3238980 | 10/1982 | Germany . |
| 3527886 | 8/1985 | Germany . |
| 3617748 | 5/1986 | Germany . |
| 29600917 | 1/1996 | Germany . |

*Primary Examiner*—Thomas R. Hannon
*Attorney, Agent, or Firm*—Bierman, Muserlian and Lucas

[57] ABSTRACT

In a linear rolling bearing comprising a solid guide rail and a U-shaped carrier body engaging therearound, the carrier body (2) being slidably supported on the guide rail by rolling elements, each deflector comprises a housing and two deflecting shells (10) inserted therein with clearance, on which shells the webs extending into the load-bearing regions for the rolling elements are formed as centering webs (11), and each deflecting shell (10) additionally comprises a projecting, centering collar (12) which extends into a return bore (6) of the carrier body (2).

9 Claims, 6 Drawing Sheets

LINEAR ROLLING BEARING

FIELD OF THE INVENTION

A linear rolling bearing comprising a solid guide rail and a U-shaped carrier body engaging therearound, the carrier body being slidably supported on the guide rail by rolling elements arranged in pairs of rows on the carrier body on both sides of the guide rail while being retained by retaining webs, said rolling elements being in rolling contact with raceways on the guide rail and the carrier body and being deflected at ends of the carrier body oriented in the moving direction and return through return bores of the carrier body, deflectors comprising integrally formed webs which extend into the region of the raceways being arranged at the ends of the carrier body.

BACKGROUND OF THE INVENTION

A misalignment of a deflector in linear rolling bearings can lead to an increase of the resistance to displacement and of the pulsatory force required for displacement or even to a fracture of the rolling element deflector. This problem is caused by the fact that external impacts on the bearing are transmitted directly to the rolling element deflector and a displacement of the rolling element raceways from the intended position occurs due to the presence of tolerances. In a linear rolling bearing of the type known from DE-OS 35 27 886, both the deflectors are one-piece structures. Each deflector comprises two projecting, retaining webs which extend through the carrier body and whose free, adjoining ends are connected by a common plug-in pin. Due to the fact that both deflectors are integral structures, it is not possible to avoid a displacement of the rolling element deflectors caused by tolerances or by impacts.

When rolling element retention is effected by retaining webs made as profiled plastic webs which can be formed by spraying directly on the deflectors and be made to extend respectively over half the length of the carrier body, the path of removal of the deflecting shell from the mold is lengthened so that it becomes very expensive. In addition, a special tool is required for the manufacturing of the deflecting shell for every carrier body length.

OBJECTS OF THE INVENTION

It is an object of the invention to create a linear rolling bearing with improved operating properties which at the same time is less sensitive to impact loading.

It is a further object of the invention to reduce design space requirement to a minimum.

Other objects of the invention are to avoid the use of many different expensive tools in the manufacture of the linear rolling bearing, to compensate for length variations of the carrier body caused by the manufacturing process and to endow the retaining webs and, with them, the entire carrier body with a high rigidity at the same time as small overall dimensions.

These and other objects and advantages of the invention will become obvious from the following detailed description.

SUMMARY OF THE INVENTION

The linear rolling bearing of the invention is comprised of a solid guide rail and a U-shaped carrier body engaging therearound, the carrier body being slidably supported on the guide rail by rolling elements arranged in pairs of rows on the carrier body on both sides of the guide rail while being retained by retaining webs (8), said rolling elements being in rolling contact with raceways (5) on the guide rail and the carrier body and being deflected at ends of the carrier body oriented in moving direction and return through return bores of the carrier body, deflectors comprising integrally formed webs which extend into a region of the raceways being arranged at the ends of the carrier body, characterized in that each deflector (7) is comprised of a housing (9) and two deflecting shells (10, 14, 15) inserted therein with clearance, on which shells webs extending into load-bearing regions for the rolling elements (4) are formed as centering webs (11), and each of the deflecting shells (10, 14, 15) additionally comprises a projecting, centering collar (12, 16, 17) which extends into a return bore (6) of the carrier body (2).

The invention achieves the above objects by each deflector being comprised of a housing and two deflecting shells inserted therein with clearance, on which shells the webs extending into the load-bearing regions for the rolling elements are formed as centering webs, and each of the deflecting shells additionally comprises a projecting, centering collar which extends into a return bore of the carrier body. Due to the clearance between the deflecting shells and their housing, the bearing is insensitive to external impacts. Because the deflecting shells engage into the return bores of the carrier body by their centering collars and into the raceway regions by their centering webs, an exact seating of the deflectors relative to the raceways and the return bores is obtained. As a result of this arrangement, only slight horizontal displacements are now possible.

The two rolling element-deflecting arrangements for each long end of the guide rail and the adjoining raceway region of the carrier body are independent of each other. A tolerance-based interdependence therefore exists only between the rolling element circuits arranged above one another on each side. However, due to the close spacing which is possible between the circuits, this is less critical and it is possible to reduce the vertical distance between the rolling element rows to a minimum.

The deflecting shells can be made as divided structures in which a part designated as outer deflecting shell comprises the centering web and one half of the centering collar, and a part designated as inner deflecting shell comprises the second half of the centering collar. The retaining webs can be arranged between two opposing, aligned centering webs of the two deflectors and can be fitted into end recesses of the centering webs by plug-in pins.

The retaining webs can also be made in the form of thin sheet metal strips having a constant cross-section over their entire length so that suitable lengths can be simply cut from the strip for use in carrier bodies of any length. The connection between the metal strip and the deflecting shells can be effected by a plugging arrangement. Further, the retaining webs may comprise longitudinal beads so that their rigidity is considerably increased.

The advantages of such a configuration are as follows: By the use of thin and, if desired, profiled sheet metal strips, a very rigid rolling element retention is obtained in a small design space, and the deflecting shells are separated from the region of retention. The retaining web is independent of length tolerances of the carrier body because it is installed with play in the plugging arrangement. In this way, a bracing of the retaining web which could detract from its proper operation cannot occur.

During the mounting of the carrier body on the guide rail, the joints between the retaining web and the two deflecting shells are situated in such a region that an impact-free transition of the rolling elements from the load-bearing region into the deflecting region is assured. Only one tool for the deflecting shells and one profiling tool for the metal retaining web are required for different carrier body lengths because these are made possible by the use of suitable cut lengths of the retaining web.

In one embodiment of the invention, the linear rolling bearing comprises a solid guide rail and a U-shaped carrier body engaging therearound, the carrier body being slidably mounted on the guide rail by rolling elements arranged in pairs of rows on the carrier body on both sides of the guide rail while being retained by retaining webs (8), said rolling elements being in rolling contact with raceways (5) on the guide rail in the carrier body and being deflected at ends of the carrier body oriented in moving direction and returned through return bores of the carrier body, deflectors comprising integrally formed webs which extend into a region of the raceways being arranged at the ends of the carrier body with each deflector (7) being comprised of a housing (9) and two deflecting shells (14,15) inserted therein with clearance, on which shells webs extending into the load bearing regions for the rolling elements (4) are formed as centering webs (11), and each of the deflecting shells (14,15) additionally comprises a projecting, centering collar (16,17) extending into a return bore (6) of the carrier body (2), the deflecting shells being made as divided structures in which a part designated as outer deflecting shell (14) comprises the centering web (11) and one half (16) of the centering collar and a part designated as inner deflecting shell (15) comprises a second half (17) of the centering collar wherein in the assembled state of the inner deflecting shell (15) and the outer deflecting shell (14), the two halves (16,,17) of the centering collar exhibit a small clearance relative to a counter bore (13) arranged on the return bore (6) of the carrier body (2) whereby any displacement between the return bore (6) with a carrier body (2) arranged one above the other during the circulation of the rolling elements (4) is compensated by slight tilting movements of the deflecting shell about a centering lug arranged between the raceways (5) of the carrier body (2).

BRIEF DESCRIPTION OF THE DRAWINGS

Examples of embodiments of the invention are represented in the drawings and will now be described in more detail.

FIG. 10 is a cross-sectional view of the carrier body of a linear rolling bearing through the region of the centering web of an outer deflecting shell in which the roller element retaining web is plugged in.

DETAILED DESCRIPTION OF THE DRAWINGS

Figure 1:
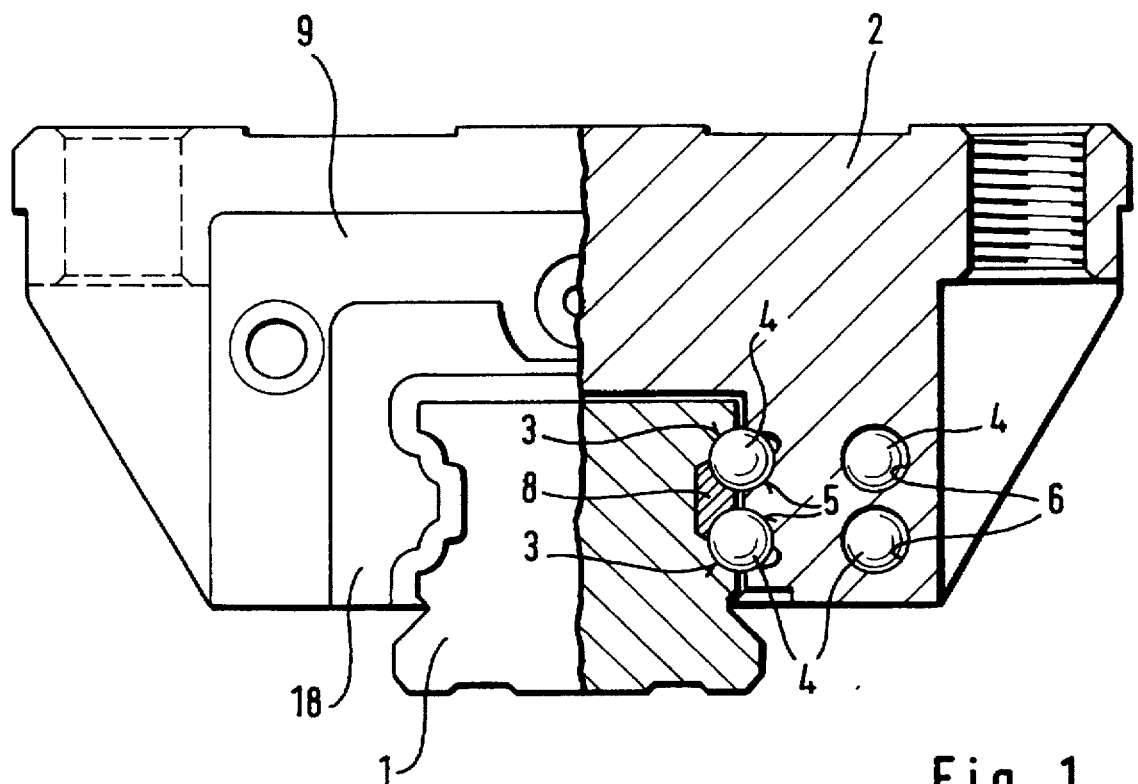
FIG. 1 is a partial end view and a partial cross-sectional view of a carrier body of a linear rolling bearing mounted on a guide rail.
Figure 2:
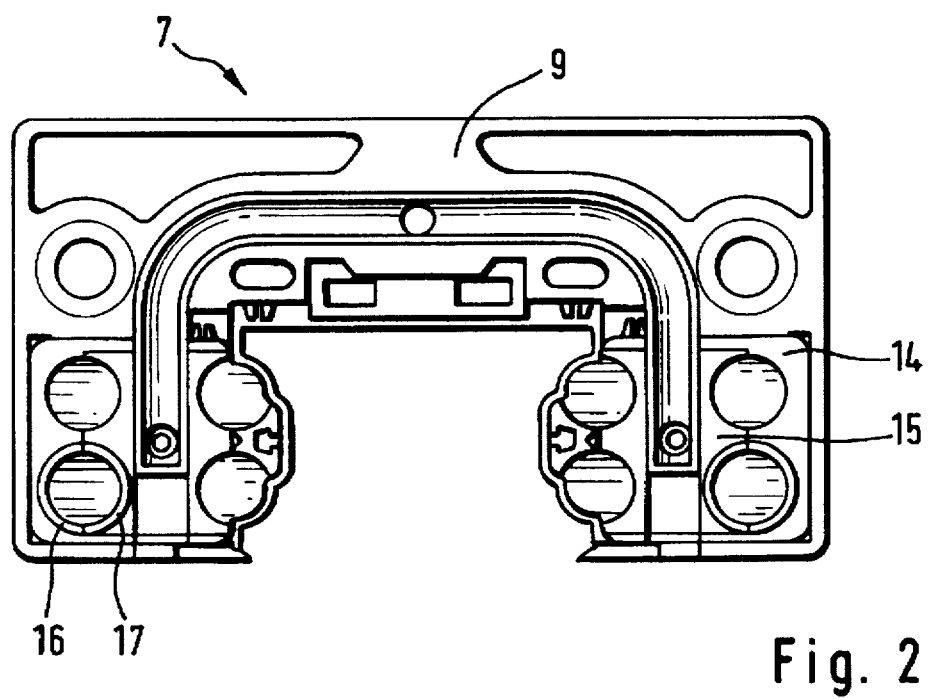
FIG. 2 is an inner view of a deflector.
Figure 4:
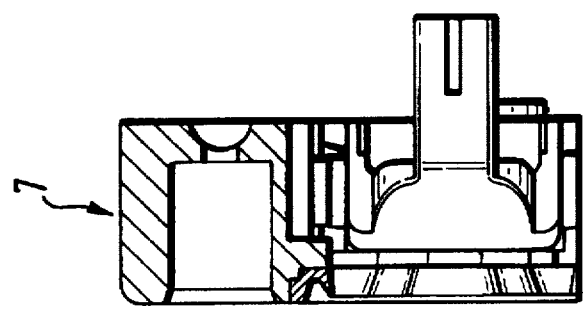
FIG. 4 is a longitudinal cross-section through the assembled deflector.

A linear rolling bearing of the invention comprises a guide rail 1 which is partially surrounded by a carrier body 2 of U-shaped cross-section. Raceways 3 for rolling elements 4 in the form of balls by which the carrier body 2 is supported on the guide rail 1 are formed on the two long ends of the guide rail 1. The carrier body 2 likewise comprises raceways 5 for the rolling elements 4 which are arranged on each long end of the guide rail 1 in two endless circuits disposed one above the other. Each circuit has a load-bearing region and a return region which are connected to each other by deflecting regions for the rolling elements 4.

The load-bearing regions are situated on the raceways 3 of the guide rail 1 and on the raceways 5 of the carrier body 2, while the return regions are formed by the respective return bores 6 of the carrier body 2. The deflecting regions are situated in deflectors 7 attached to the carrier body at the two ends thereof oriented respectively in or opposite to the moving direction. Between the rolling elements 4 of the lower circuit and the rolling elements 4 of the upper circuit, there is disposed in the region of the guide rail 1, a retaining web 8 which prevents the rolling elements 4 from falling out of the carrier body 2 when this is taken off the guide rail 1. It is necessary to hold the rolling elements 4 on the carrier body 2 when this is separated from the guide rail 1 so that the rolling elements 4 are not lost when the carrier body 2 is transported without the guide rail 1 during the mounting of the carrier body 2 on the guide rail 1.

Figure 7:
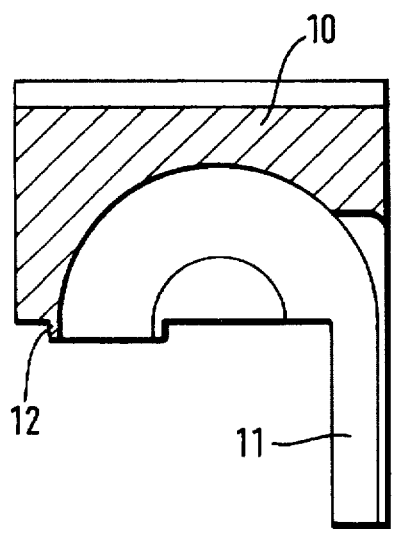
FIG. 7 shows a modified deflecting shell in a horizontal cross-section.
Figure 8:
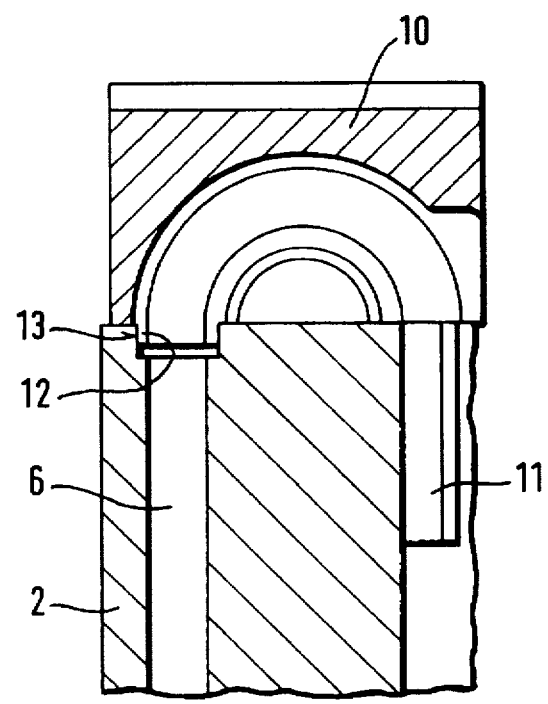
FIG. 8 is a horizontal cross-sectional view of a modified deflecting shell mounted on a carrier body.

Each deflector 7 comprises a housing 9 for lodging deflecting shells which can be one-piece structures as shown in FIGS. 7 and 8 or have a two-piece configuration as shown in FIGS. 3 to 6. The deflecting shell 10 of FIG. 7 has a projecting, centering web 11 which extends into the Carrier body 2 and further, a projecting, annular centering collar 12 pointing towards the carrier body 2 and inserted into the return bore 6 of the carrier body 2. A counterbore 13 is provided at the end of the return bore 6 to achieve centering.

Figure 3:
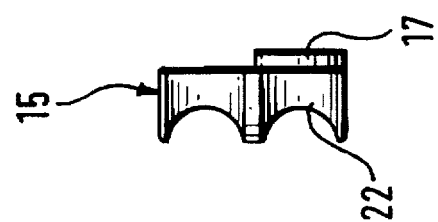
FIG. 3 is an exploded representation of the individual parts of the deflector in a longitudinal cross-section and in a side view.
Figure 3:
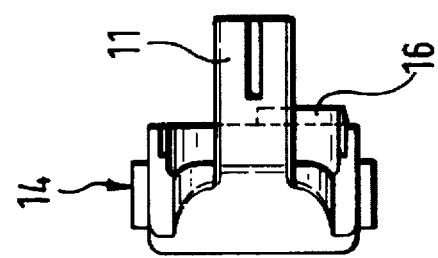
Figure 3:
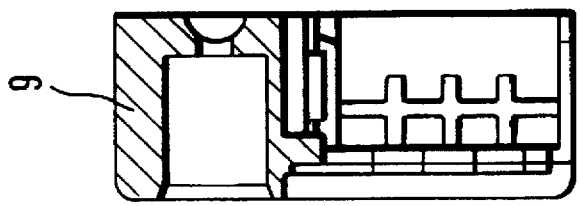
Figure 3:
Figure 5:
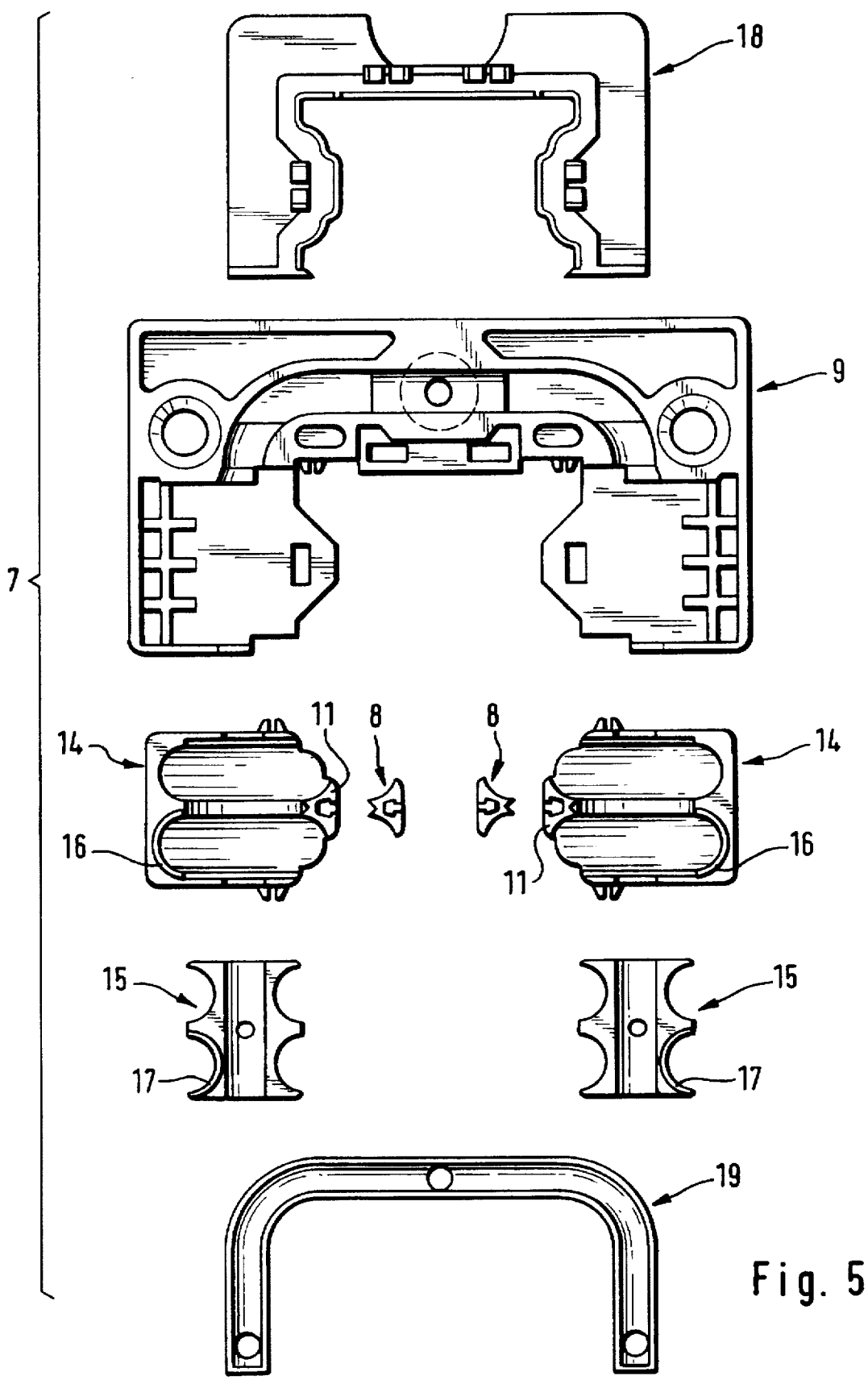
FIG. 5 is an exploded representation of the individual parts of the deflector in an inner view.
Figure 6:
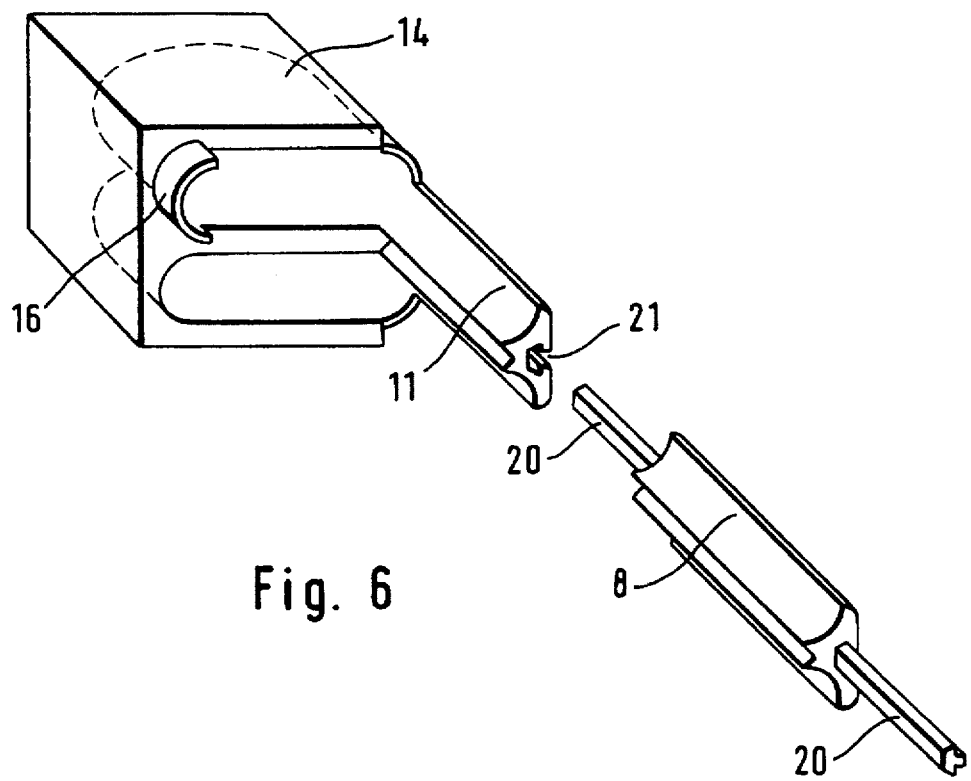
FIG. 6 is a perspective view of an outer deflecting shell.

It can be seen in FIG. 3 that the deflecting shell of this embodiment is divided into an outer deflecting shell 14 and an inner deflecting shell 15. The outer deflecting shell 14 comprises the projecting, centering web 11 and one half 16 of the centering collar, while the second half 17 of the centering collar is formed on the inner deflecting shell 15. In the assembled state, when the outer deflecting shell 14 and the inner deflecting shell 15 are inserted in the housing 9, the two halves 16 and 17 of the centering collar together form the complete annular centering collar. In the region of deflection, the inner deflecting shell 15 has a profile 22 which is of complementary configuration to the outer deflecting shell 14.

The deflector 7 further comprises a front wiper 18 which is inserted into the housing 9 on the outer end surface thereof. Finally, a lubricating canal insert 19 is arranged within the housing 9. The retaining web 8 is arranged in each case between the aligned centering webs 11 of the deflecting shells 10 or 14, as the case may be, of the two ends of the carrier body 2. The retaining web 8 has the same cross-sectional shape as the centering webs 11 and connects these to each other. For fixing the retaining web 8 to the centering webs 11, the retaining web 8 comprises plugin pins 20 which project therefrom and are fitted into recesses 21 of the centering webs 11.

Figure 9:
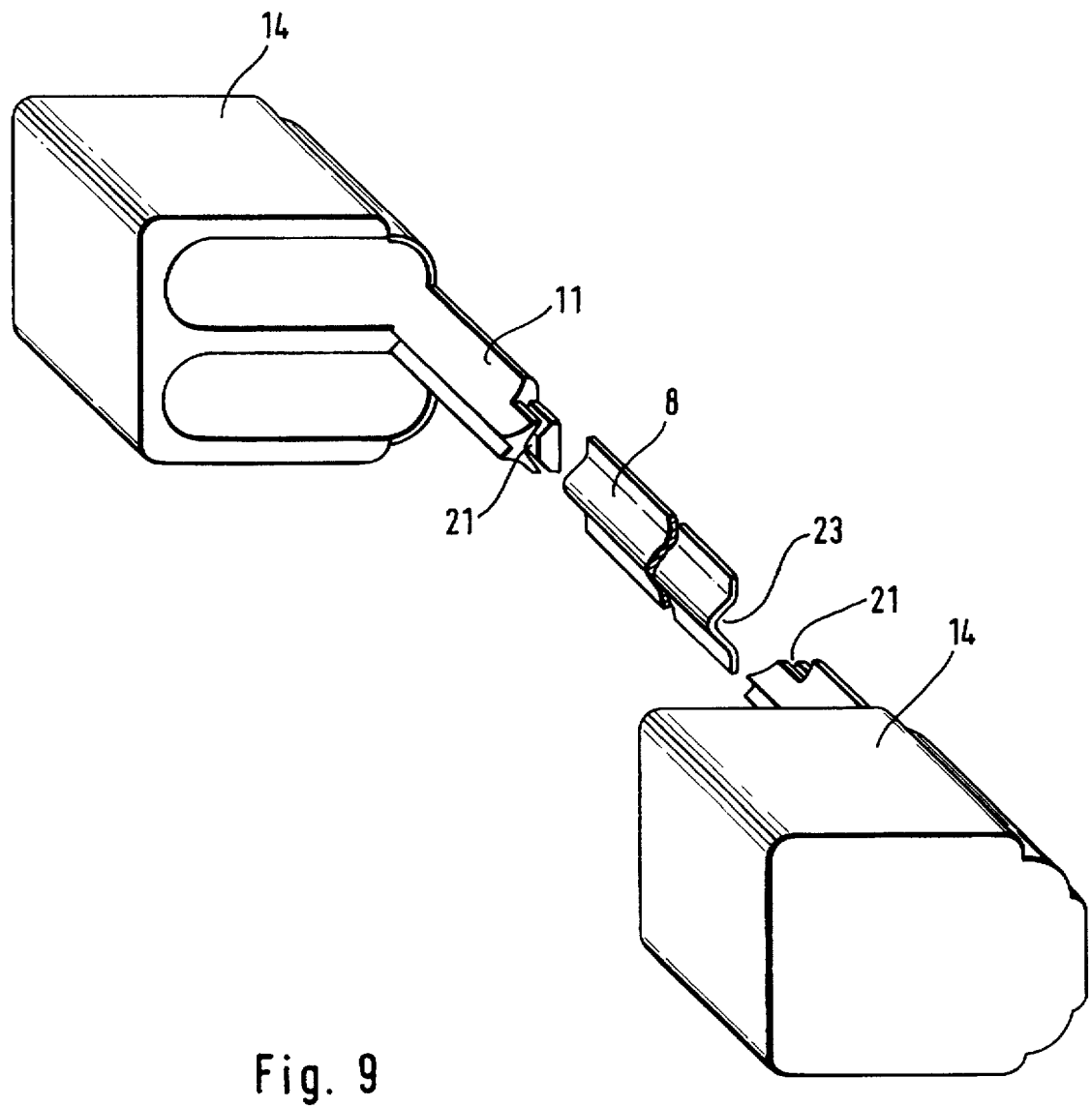
FIG. 9 is a perspective view of a retaining web arranged between two outer deflecting shells comprising centering webs,. the centering collar halves, however, are not shown.
Figure 10:
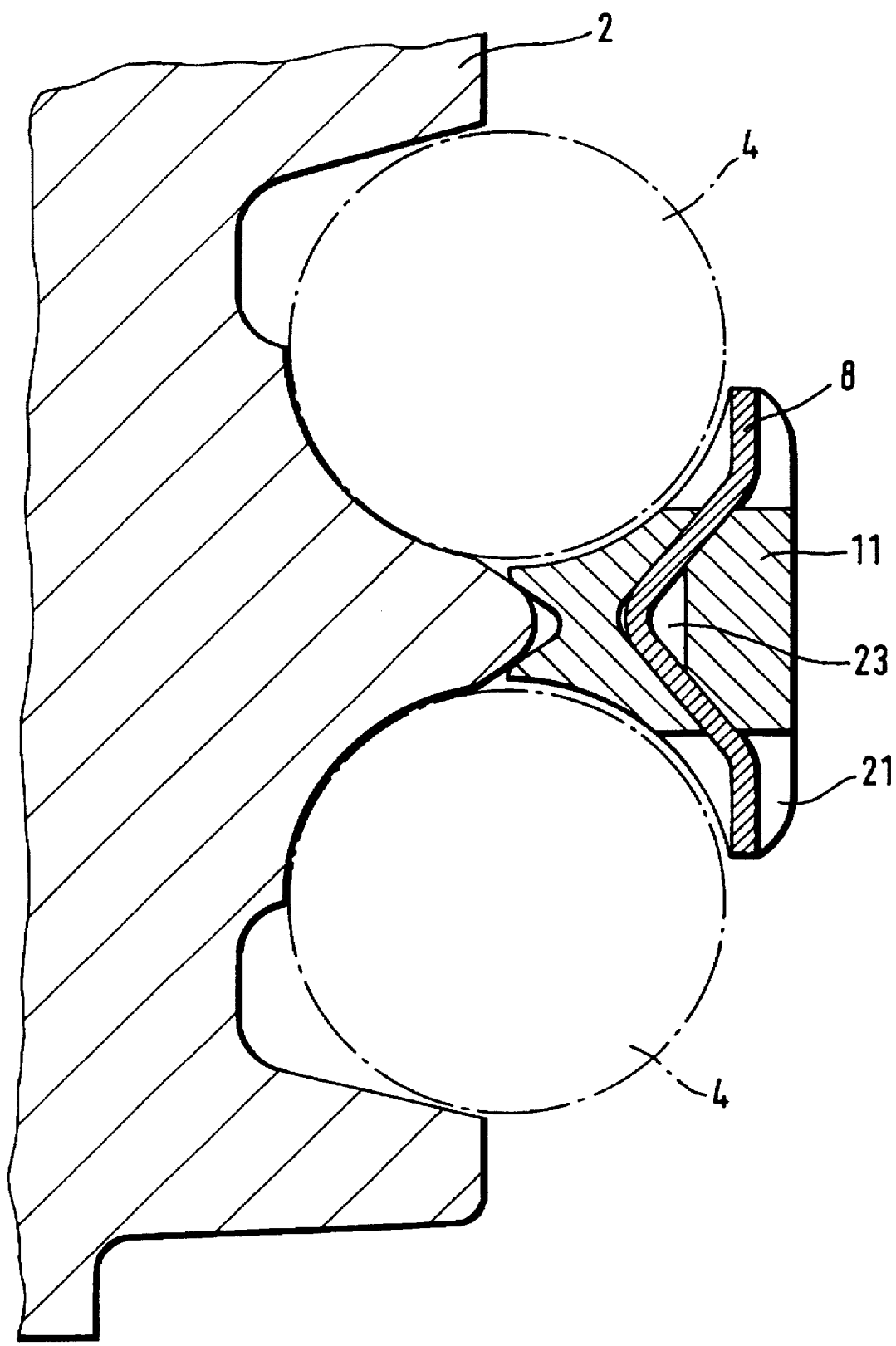

The retaining web 8 shown in FIGS. 9 and 10 is configured as a thin sheet metal strip with a constant cross-section. To increase its rigidity, the sheet metal strip is deformed so that a bead 23 is formed along its entire length starting from its side turned away from the carrier body 2. For fixing the retaining web 8 between the centering webs 11, these latter likewise comprise recesses 21 into which the ends of the retaining web 8 are fitted.

Various modifications of the linear rolling bearing of the invention may be made without departing from the spirit or scope thereof and it is to be understood that the invention is intended to be limited only as defined in the appended claims.

What we claim is:

1. A linear rolling bearing comprising a solid guide rail and a U-shaped carrier body engaging therearound, the carrier body being slidably supported on the guide rail by rolling elements arranged in pairs of rows on the carrier body on both sides of the guide rail while being retained by retaining webs (8), said rolling elements being in rolling contact with raceways (5) on the guide rail and the carrier body and being deflected at ends of the carrier body oriented in moving direction and return through return bores of the carrier body, deflectors comprising integrally formed webs which extend into a region of the raceways being arranged at the ends of the carrier body, characterized in that each deflector (7) is comprised of a housing (9) and two deflecting shells (10, 14, 15) inserted therein with clearance, on which shells/webs extending into load-bearing regions for the rolling elements (4) are formed as centering webs (11), and each of the deflecting shells (10, 14, 15) additionally comprises a projecting, centering collar (12, 16, 17) which extends into a return bore (6) of the carrier body (2).

2. A linear rolling bearing of claim 1 wherein the centering webs (11) extend into the load-bearing regions formed by the raceways (5).

3. A linear rolling bearing of claim 1 wherein the deflecting shells are made as divided structures in which a part designated as outer deflecting shell (14) comprises the centering web (11) and one half (16) of the centering collar, and a part designated as inner deflecting shell (15) comprises a second half (17) of the centering collar.

4. A linear rolling bearing of claim 3 wherein, in a deflecting region, the inner deflecting shell (15) comprises a profile (22) which is of complementary shape to the outer deflecting shell (14).

5. A linear rolling bearing of claim 3 wherein, in the assembled state of the inner deflecting shell (15) and the outer deflecting shell (14), the two halves (16, 17) of the centering collar exhibit a small clearance relative to a counterbore (13) arranged on the return bore (6) of the carrier body (2) whereby any displacement between the return bores (6) of the carrier body (2) arranged one above the other during the circulation of the rolling elements (4) is compensated by slight tilting movements of the deflecting shell about a centering lug arranged between the raceways (5) of the carrier body (2).

6. A linear rolling bearing of claim 1 wherein the retaining webs (8) are arranged between two opposing, aligned centering webs (11) of the two deflectors (7) while being fitted into end recesses (21) of the centering webs (11) by plug-in pins (20).

7. A linear rolling bearing of claim 6 wherein the retaining webs (8) are made in the form of thin sheet metal strips.

8. A linear rolling bearing of claim 7 wherein the retaining webs (8) have a constant cross-section over their entire length.

9. A linear rolling bearing of claim 7 wherein the retaining webs (8) comprise a longitudinal bead (23).

* * * * *